Nov. 15, 1966     L. L. AZURE, JR     3,284,929
TEST GRADING MACHINE
Original Filed May 19, 1964     4 Sheets-Sheet 1
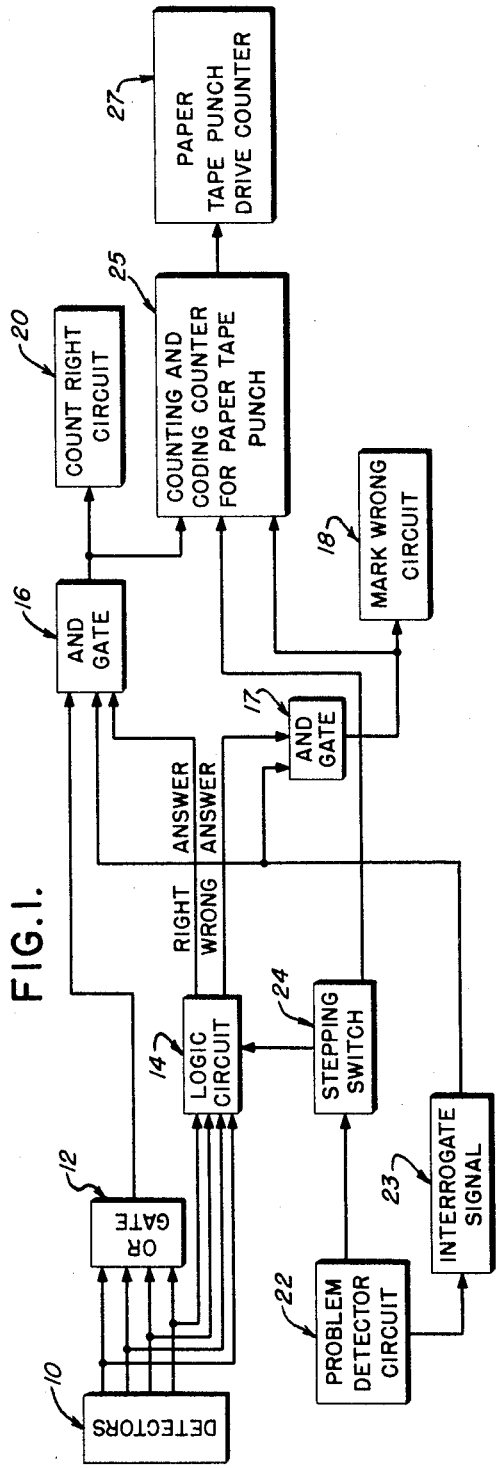
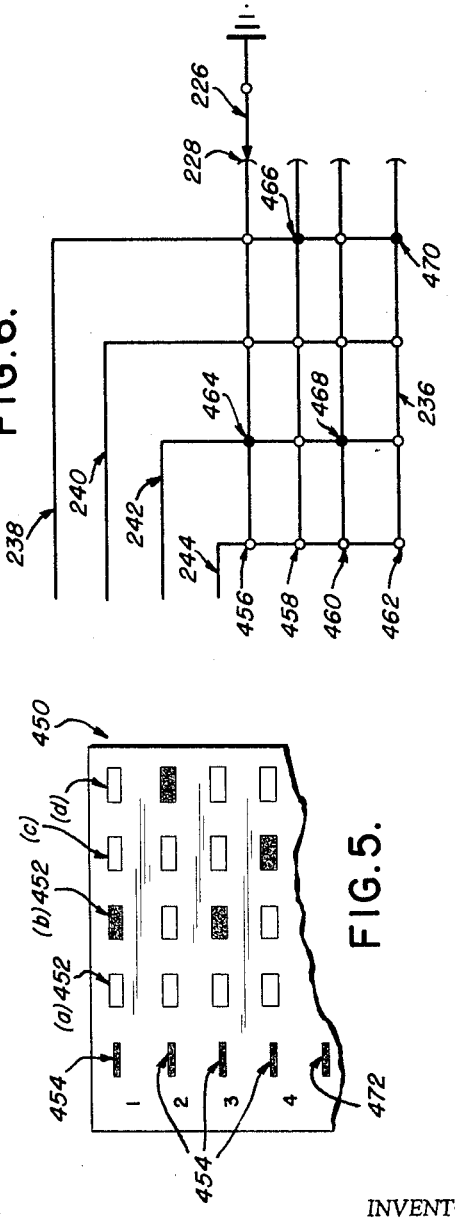
INVENTOR
LEO L. AZURE, Jr.
BY
*Irons, Birch, Swindler & McKie*
ATTORNEYS Nov. 15, 1966     L. L. AZURE, JR     3,284,929

TEST GRADING MACHINE

Original Filed May 19, 1964     4 Sheets-Sheet 2

INVENTOR
LEO L. AZURE, Jr.

BY Irons, Birch, Swindler & McKie
ATTORNEYS

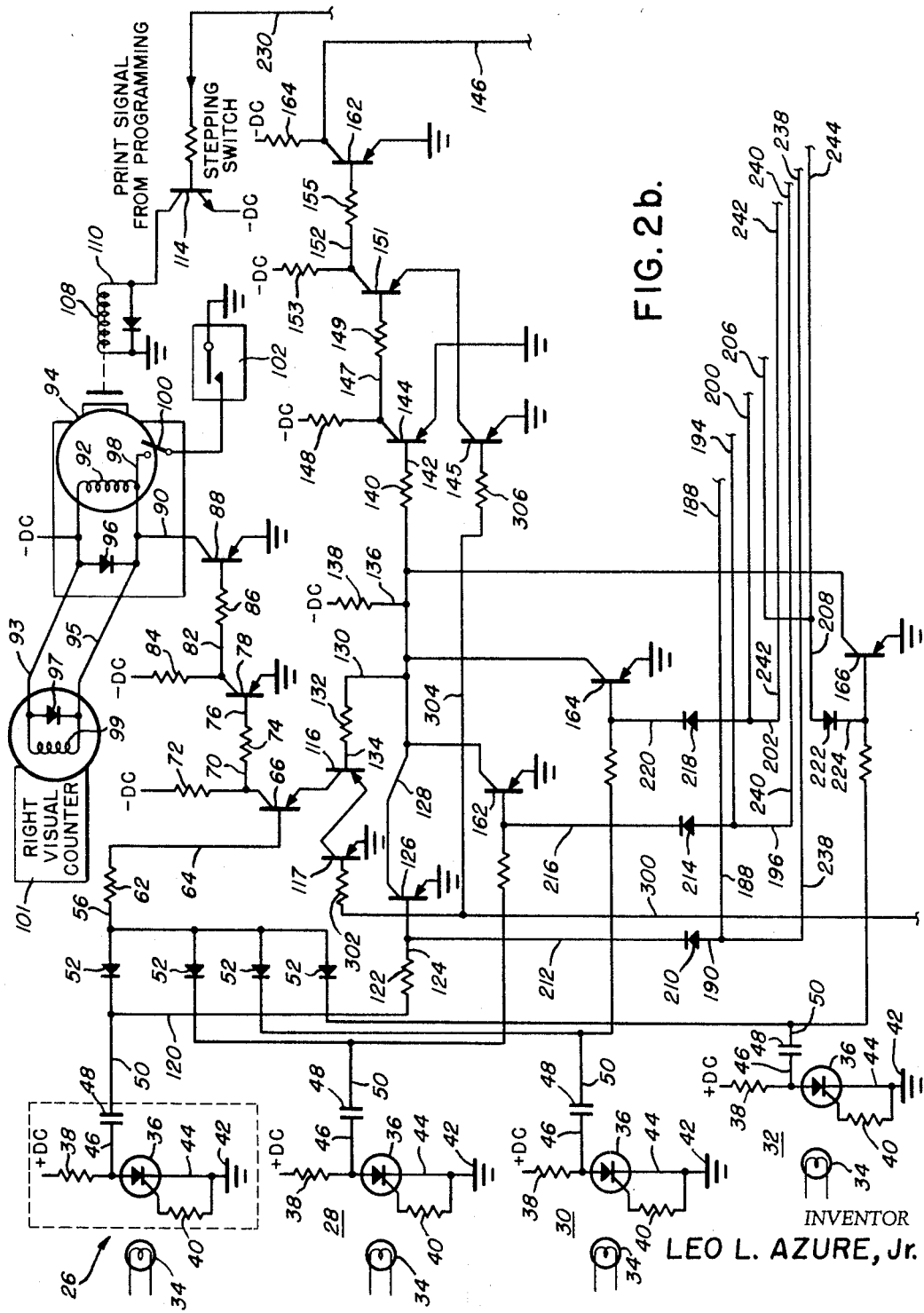

INVENTOR
LEO L. AZURE, Jr.

United States Patent Office 3,284,929
Patented Nov. 15, 1966

3,284,929
TEST GRADING MACHINE
Leo L. Azure, Jr., Richland, Wash., assignor, by mesne assignments, to Automata Corporation, a corporation of Washington
Continuation of application Ser. No. 368,612, May 19, 1964. This application Apr. 6, 1966, Ser. No. 540,711
16 Claims. (Cl. 35—48)

This application is a continuation of my previously filed copending application Serial No. 368,612, filed May 19, 1964, and entitled, "Test Grading Machine," now abandoned.

This invention relates to a test grading machine and more particularly, to a machine for grading and marking test cards bearing indicia representing answers or responses to problems of the multiple choice answer type.

Machines for grading and marking test sheets or cards are well known in the prior art. Many of the prior art machines, however, do not provide automatic operation and provide merely a comparison of the indicated responses on the test card with the correct responses and thus require the individual correcting the test card to personally apply a mark indicating the incorrect answers and to totalize the responses on the test card to indicate the score or grade achieved. Others of these prior art machines provide for making an indication on the test card to identify problems which have been answered incorrectly.

Still others of the prior art machines provide for marking the correct answer position to each problem on the test card and for totalizing the number of correct responses for automatically grading the test and for printing the grade thus achieved on the test.

None of the prior art machines, however, provide for marking the correct answer position on the test card only for each problem which has been answered incorrectly; further, none of the prior art machines provide such a marking capability and, in addition, a capability of distinguishing between incorrect responses and the absence of any response to a given problem. It is highly desirable to provide this latter function, in that thereby a greater penalty for marking a wrong answer than for failing to mark any answer may be provided to discourage guessing on the part of a student taking the test. In addition, the marking of the right answer position is highly desirable in that the student is thereby informed of the correct answer upon receiving his graded test sheet.

The test grading machine of the invention is relatively inexpensive in cost of components and construction and employs as components items which are readily available commercially. The machine is very simple to operate and therefore does not require trained personnel for grading the test cards; for example, the operator need merely insert as large a group of test cards as is desired into a receiving bin on the machine and the machine thereafter automatically corrects and grades each test card in succession. If desired, a totalizing counter may be provided which accumulates the number of correct responses on all of the test cards of a group thereof, such as all of the test cards of an entire class. The operator may thereafter readily compute the class average by dividing the total of correct responses by the number of test cards graded.

It is therefore an object of this invention to provide an improved machine for grading and marking test cards bearing responses to test problems of a multiple choice variety.

It is a further object of this invention to provide a machine for grading test cards bearing responses to problems of a multiple choice variety wherein the machine automatically marks the correct response to each problem in the event that it is answered incorrectly on the test card.

Another object of this invention is to provide a machine for grading and marking test cards bearing responses to problems of the multiple choice variety wherein the machine accumulates counts distinguishing between incorrect and omitted responses to the problems of the test.

It is a further object of this invention to provide a machine for grading and marking test cards bearing responses to problems of the multiple choice variety wherein the machine is low in cost and automatic in operation.

In accordance with a preferred embodiment of the invention, the test grading machine includes a sensing station through which test cards are passed for effecting the grading and marking operations. Each of the test cards includes a plurality of columns of positions adapted for receiving an indicia, such as a pencil mark, representing a response to each problem of a plurality of problems on the test card. The sensing station includes a plurality of sensing means corresponding to the plurlity of columns of answer positions. Preferably, the sensing station includes an illuminating means and a plurality of light-sensitive devices, the latter corresponding to the columns of answer positions on the test card and detecting the presence or absence of an indicia at each such answer position for each problem as the card advances through the sensing station. The machine also includes a programming station in which is stored information comprising the correct answers to the problems of the test. Means are provided for scanning or sensing the information in the programming station in time-coordinated relationship with the scanning of the test cards. A logic circuit is provided which compares the information from the sensing station, and thus the information derived from scanning the multiple choice answer positions of the test card, with the information from the programming station to determine whether, for each problem, there is an indicia at an answer position and, if so, if the indicia represents a correct or an incorrect response to the problem. A mark wrong circuit is provided which includes a plurality of marking devices corresponding to the plurality of columns of answer position or answer indication areas. For each problem on the test the programmer establishes an enabling circuit to energize the marking device corresponding to the correct answer position for that problem whereby the marking device may mark the test card in the proximity of the correct answer position. An inhibit circuit is operative in response to the logic circuit to prevent the marking operation in the event that a correct answer has been provided, and to enable the marking operation in the event that an incorrect answer has been provided on the test card. The test card thus is marked to clearly indicate the correct answer to each incorrectly answered problem. The machine further includes a counting or totalizing means for accumulating a count representing the number of correct responses and a second counting means for accumulating a count representing the number of incorrect responses on each test card.

For a better understanding of the invention, reference may be had to the following description and drawings, in which:

FIGURE 1 is a block diagram representing the basic component systems of a test grading machine constructed in accordance with a preferred embodiment of the invention;

FIGURES 2a and 2b, together comprise a circuit schematic of the test grading machine of the invention in accordance with the block diagram of FIGURE 1;

FIGURE 5 shows, in fragmentary section, a test card suitable for use in the test grading machine of the invention; and, FIGURE 6 is a schematic of the switchboard shown in FIGURE 2a in a rotated view to correspond to the answer indication areas of the test card of FIGURE 5.

Figure 2A:
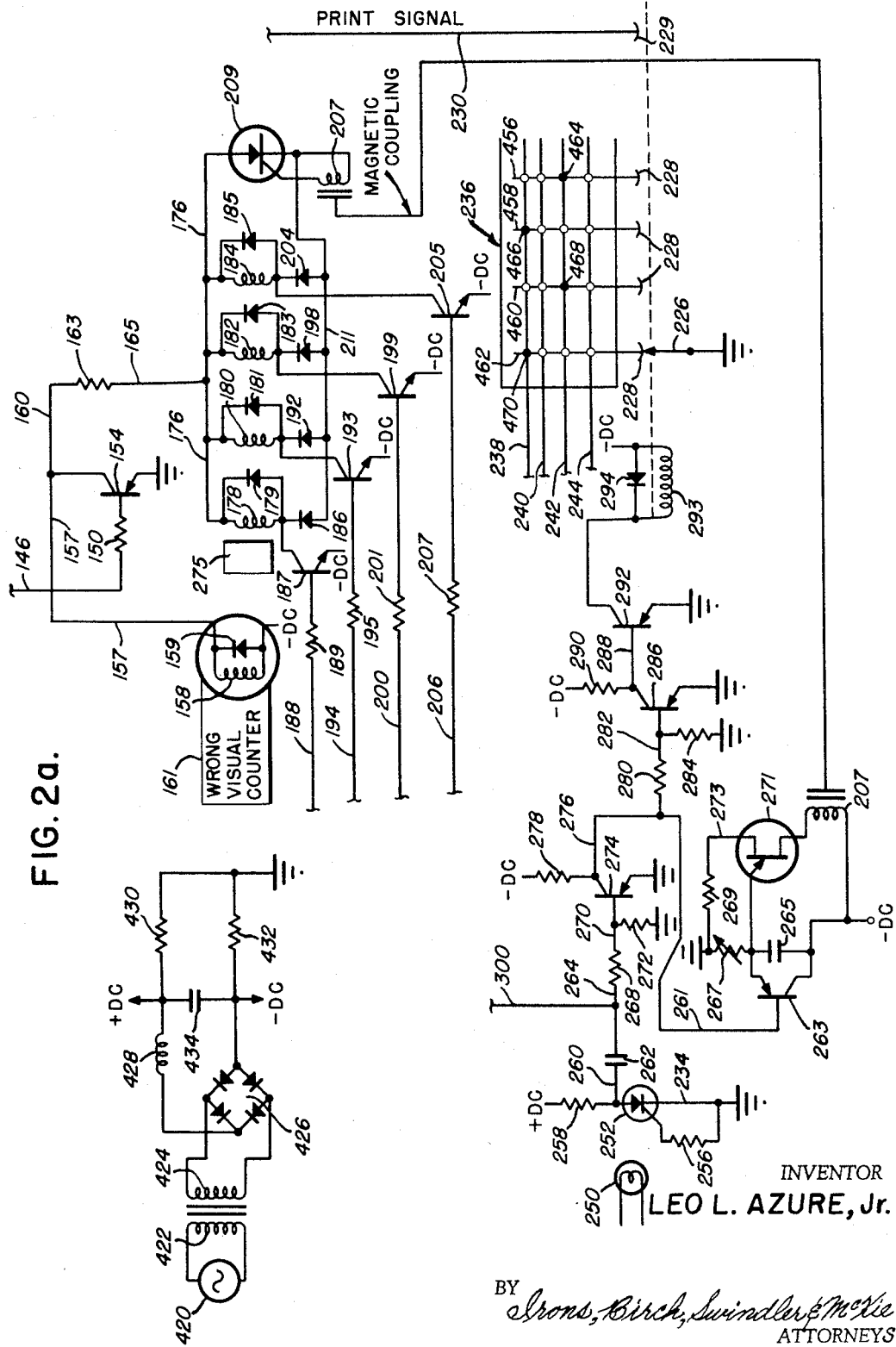

In FIGURE 5 is shown a test card 450 of the type suitable for use with the test grading machine of the invention. A plurality of vertical columns a, b, c, and d or answer positions or indication areas 452 of rectangular configuration are imprinted on the test card; the rectangular answer positions are also aligned horizontally with a vertical column of numbers 1, 2, 3, 4 . . . which identify each horizontally aligned group of answer positions with a corresponding test problem. The test card 450 is employed to indicate responses to test problems of the multiple choice variety; for example, should the examinee taking the test determine that answer b is the correct answer to problem 1, the examinee would then apply an indicia to the answer position in column (b) for problem 1. Preferably, this indicia comprises darkening the answer position (b) within the rectangular configuration thereof by a pencil or other marking implement. Thus, answer position (b) to problem 1 is shown as a solid, darkened rectangle in FIGURE 5. Similarly, answers to problems 2, 3, and 4 are indicated by darkened answer positions (d), (b), and (c), respectively.

There is also provided on the test card 450 a fifth column of problem detector marks 454, each of which is aligned with a corresponding horizontal row of answer positions and thus with a corresponding one of the problems 1, 2, 3, 4 . . . A timing mark 472 is also printed on the test card 450 in line with the vertical column of problem detector marks 454, but not aligned with the horizontal answer positions of any problem. The purpose of the problem detector marks 454 and the timing mark 472 will be described hereafter.

It wil be appreciated that the number of possible multiple choice answers to a given problem, and thus the number of corresponding answer positions for each problem on the test card 450, and the total number of problems in a given test may be of any desired magnitude. For convenience and clarity of description, however, the machine of the invention is shown in an embodiment employing merely four possible answer positions to each problem.

In FIGURE 1 there is shown a block diagram of the basic components of the machine of the invention in accordance with a preferred embodiment thereof. The unit labelled detectors 10 comprises a sensing station including a plurality of detectors. The test cards 450 are passed therethrough in endwise fashion; the detectors are arranged so as to be aligned with the vertical columns of answer positions a, b, c, and d on the test card 450 of FIGURE 5 as it passes therethrough and operate to detect the presence or absence of an indicia at each of the answer positions for each successive problem on the test card 450. The information derived from the scanning of the test card 450 passing through the sensing station comprising the detectors 10 is provided in a plurality of output lines corresponding to the information at the plurality of answer positions for each problem in sequence. The plurality of output lines apply the sensed information to the input of an OR-gate 12 and to the input of a logic circuit 14. The logic circuit 14 includes a plurality of comparison means respectively associated with, and receiving the answer information detected by the plurality of detectors 10.

The logic circuit 14 includes storage means (not shown) for storing in the test grading machine the correct answers to each of the plurality of problems. A stepping switch 24 scans the storage means (not shown) of the logic circuit 14 in time-coordinated relationship with scanning of each test card 450 passing through the sensing station comprising the detectors 10. The time coordination is provided by a problem detector circuit 22 which includes means for sensing each of the problem detector marks 454 of the test card 450; shown in FIGURE 5. The problem detector circuit 22 produces an output signal which is applied to the stepping switch 24 and which causes the latter to scan the information stored in the storage means (not shown) of logic circuit 14. The output information from the storage means (not shown) for each successive problem comprises a plurality of signals indicating the correct answer for each problem. This plurality of correct answer signals also is applied to respectively associated ones of the comparison means of the logic circuit 14. The logic circuit 14 is operative to compare the information sensed by the detectors 10 with the information stored in the logic circuit 14 for each individual problem on the test.

The system further includes an AND-gate 16 and a count right circuit 20 which receive information corresponding to correct answers on the test sheet. When the comparison function of logic circuit 14 determines that a correct answers on the test card has been made for a given problem, it produces an output signal labelled "Right Answer" which is applied to a first input of AND-gate 16. The OR-gate 12 produces an output signal at its output in response to each problem for which some response has been made, which signal is applied to a second input of AND-gate 16. The problem detector circuit 22, in response to each problem detector mark 454, produces an interrogate signal, as indicated by the unit 23 labelled interrogate signal, which is applied to a third input of the AND-gate 16. When the AND-gate 16 receives simultaneously at its inputs the foregoing three signals, it produces an output signal which is applied to the count right circuit 20, the latter thereby accumulating one count representing a correct answer on the test card.

A mark-wrong circuit 18 includes a plurality of marking devices (not shown) corresponding to the plurality of columns of answer positions on the test card 450 and positioned in alignment therewith. Preferably, each marking device comprises a solenoid-actuated marker individually operable to produce an indication on the test card 450 in the proximity of each of the answer positions. The mark-wrong circuit 18 includes a plurality of inputs (not shown) to which is applied the information sensed from the storage means of logic circuit 14. Each of the marking devices is adapted to be energized by an associated one of the outputs from the storage means (not shown), whereby for each problem, the marking device associated with the correct answer position for that problem is adapted to be energized to provide the correct answer indication on the test card, described above.

In accordance with the invention, however, the correct answer position is to be marked only in the event that an incorrect answer has been provided on the test card. AND-gate 17 controls the operation of the mark-wrong circuit 18 to achieve this effect. If the logic circuit 14 determines that an incorrect answer to a given problem has been provided on the test cards a signal is produced at a second output of the logic circuit 14, labelled, "Wrong Answer," and applied to an input of AND-gate 17. The interrogate signal 23 from the problem detector circuit 22 is applied to a second input of the AND-gate 17. When the two inputs to AND-gate 17 occur simultaneously, the mark-wrong circuit 18 is operable to effect energization of the solenoid marking device associated with the correct answer position, and thereby to mark the indication as described above. Conversely, if the logic circuit 14 determines that the correct answer position has been marked on the test card, no wrong answer output is produced and thus AND-gate 17 is not enabled, thereby inhibiting the operation of the mark-wrong circuit 18. As a result, there is no marking of the test sheet by the mark-wrong solenoid associated with the correct answer position.

The mark-wrong circuit 18 may also include a counter (not shown) for accumulating the number of incorrect responses on each test card. Since the count right circuit 20 accumulates only correct responses and the counter (not shown) of mark-wrong circuit 18 accumulates only incorrect responses, it is apparent that the number of problems for which no answer was marked on the test card 450—i.e., omitted answers—may readily be determined.

The system of the invention may also provide outputs, as indicated, for driving a counting and coding counter for paper tape punch, shown as unit 25, and a paper tape punch drive counter, shown as unit 27. These units 25 and 27 may provide additional computations in determining the value of problems on the test for weighting purposes and calculating the grade of the test and also provide permanent records of the grades accumulated. In addition, the units 25 and 27 provide compatibility with data processing system and computers with which it may be desired to employ the test grading machine of the invention.

The schematic of the test grading machine of the invention is shown in two separate FIGURES 2a and 2b for purposes of clarity. The portions of the schematics of FIGURES 2a and 2b corresponding to the system components of FIGURE 1 will be identified in the following description.

In FIGURE 2b, the sensing station includes a plurality of individual detectors 26, 28, 30, and 32. Each of the detectors 26, 28, 30, and 32 is identical in construction and therefore identical identifying numerals are employed for describing the elements of each detector circuit, and the discussion thereof will be limited to detector 26. The detector 26 includes an illuminating means such as a lamp 34 and a light-sensitive device such as the light-sensitive silicon-controlled rectifier (SCR) 36. The light-sensitive SCR 36 is a commercially available item manufactured and sold by Solid State Products, Inc., of Salem, Massachusetts, under the trademark "Photran." Any light-sensitive detector may be employed in place of the light-sensitive SCR 36, however. The light-sensitive SCR 36 is connected at its anode through a resistor 38 to a power supply terminal at a positive direct current voltage and at its cathode through a line 44 to a power supply terminal 42 at ground potential. The gate terminal of the light-sensitive SCR 36 is connected through a resistor 40 to the power supply terminal 42 at ground potential. The output of the detector 26 is provided on line 50 which is connected through capacitor 48 and line 46 to the anode terminal of the light-sensitive SCR 36. The outputs of the detectors 28, 30, and 32 are similarly provided on lines 50 which are connected through respectively associated capacitors 48 to the anode terminal of the corresponding light-sensitive SCR's 36.

In operation, when a test card is passed through the sensing station comprising the detectors 26, 28, 30, and 32, the light impinging on the test card is reflected and sensed by the light-sensitive SCR's 36. It is apparent that with suitable masking techniques, a single light source may be employed in the alternative to the plural light sources 34. The light reflected from the test sheet to the light-sensitive SCR's 36 maintains the latter in a normally conducting state. However, when an indicia is present in one or more of the answer indication areas, the percentage of reflected light is decreased and the associated light-sensitive SCR's 36 corresponding to indication areas bearing indicia terminates conduction. Since the test card passes continuously through the sensing station, the termination of conduction of a given light-sensitive SCR 36 in response to sensing of an indicia exists only for the duration of passing of the indicia. After the indicia has passed, the reflected light from the test sheet again initiates conduction of any light-sensitive SCR 36, the conduction of which was terminated during detection of an indicia. The termination and initiation of conduction of a given light-sensitive SCR 36 produces initially a positive and then a negative voltage pulse on the associated output line of its corresponding detector. The capacitors 48 effect isolation of the voltage at the anode terminal of each light-sensitive SCR 36 which has not responded to the presence of an indicia in its corresponding answer indication area, and thus no output signal is produced on the output lines 50 of the corresponding detectors.

The OR-gate 12 comprises a plurality of semiconductor diodes 52 which are connected at their respective cathode terminals to an associated one of the output lines 50 of the detectors 26, 28, 30, and 32, and are connected in parallel at their anode terminals to a connecting lead 56.

The storage means of the logic circuit 14 may take any of various forms whereby the correct answer information for each of a plurality of multiple choice problems may be stored. In accordance with a preferred embodiment of the invention, the storage means is shown in FIGURE 2a, and comprises a switchboard 236 comprising a plurality of longitudinal lines 238, 240, 242 and 244 and a plurality of transverse lines 456, 458, 460, and 462. The longitudinal lines 238, 240, 242, and 244 correspond to the multiple choice answers d, c, b, and a, respectively, and the transverse lines 456, 458, 460, and 462 correspond to the problems 4 through 1 on the test card 450 of FIGURE 5. The test card 450 is passed through the sensing station with the bottom end edge leading, and graded from the last problem to the first to permit printing the accumulated grade score at the top margin of the test card 450. Thus, line 456 corresponds to the last problem on the test, indicated to be problem number 4 on the test card 450 of FIGURE 5.

The circular intersections of the longitudinal lines 238, 240, 242, and 244 with the transverse lines 456, 458, 460, and 462 represent open circuit connections. To program the correct answer information into the switchboard 236 for storage therein, a connecting pin is inserted into the appropriate intersection of a transverse line corresponding to a given problem with the longitudinal line corresponding to the column of the correct answer indication area for that problem. The shorting pin provides a direct connection between the transverse and longitudinal lines which may be sensed for indicating the correct answer information to other portions of the circuit system.

Each of the transverse lines 456, 458, 460, and 462 termintaes in a corresponding one of a plurality of contacts 228. A contact 229 disposed in alignment with the contacts 228, but not connected to the switchboard 236, is provided for producing a print signal upon completion of grading a given test card. The plurality of contacts 228 and contact 229 are commutated by a contact arm 226 of the stepping switch 24. The contact arm 226 is connected to a power supply terminal at ground potential such that, as it is successively stepped to move into contact with each of the contacts 228 and 229, the connecting lines associated therewith are connected to ground potential. In a manner to be described, the stepping switch 24 moves the contact arm 226 in time-coordinated relationship with the sensing of the test card passing through the sensing station such that the information sensed from the switchboard 236 is in time coordination with the corresponding problems sensed by the detectors 10 of the sensing station.

A comparison of the location of connecting pins in the switchboard 236 with the location of answer indicia in the answer indication areas of the test card 450 of FIG. 5 will clarify the information storage function and the indication functions of the switchboard 236 relative to the answer information sensed from the test card 450. To facilitate this comparison, the switchboard 236 is represented in FIG. 6 in a configuration to conform to the arrangement of answer indication areas on the test card 450 in the immediately adjacent FIGURE 5. To facilitate illustrating the switchboard 236 in this configuration, the transverse and longitudinal lines and the contacts 228 have been rearranged. The location of pin 470 interconnecting transverse line 462 and longitudinal line 238 indicates that the corresponding answer indication area *d* of problem 4 represents a correct answer to problem 4. In test sheet 450, the answer indicia is applied to indication area *c* of problem 4; as a result, problem 4 has been answered incorrectly.

Connecting pin 468 interconnects lines 242 and 460, indicating that the corresponding answer indication area *b* is the correct answer position for problem number 3 on test card 450. An answer indicia is applied to indication area *b* for problem 3, and thus problem 3 has been answered correctly on the test card 450. Similarly, connecting pins 466 and 464 indicate that the correct answers to problems 2 and 1 correspond to answer indication areas *d* and *b*, respectively. With regard to test card 450, answer indicia are located at the answer indication area *d* and *b* for problems 2 and 1, respectively, representing that correct answers to these problems have been provided.

The problem detector circuit 22, the schematic of which is shown in FIGURE 2*a*, includes a light-sensitive detection circuit substantially similar to the detectors 26, 28, 30 and 32 of FIGURE 2*b*. The detection circuit of problem detector circuit 22 includes a light-sensitive SCR 252 connected at its cathode terminal through line 234 to a power supply terminal at ground potential and at anode terminal through a resistor 258 to a power supply terminal at a positive direct current voltage. The gate terminal of light-sensitive SCR 252 is connected through resistor 256 to the ground terminal. Light-sensitive SCR 252 preferably responds to the light output of an illumination means 250, reflected from the surface of a test card 450 passing through the detection circuit. The light-sensitive SCR 252 switches between conduction and non-conduction in the manner of the light-sensitive devices of the detectors 26, 28, 30 and 32, as described above to produce an output signal on the line 260 connected to its anode terminal. Line 260 is connected through capacitor 262 to line 264 on which the output pulse of the light-sensitive detection circuit portion of the problem detection circuit 22 is produced. It will be appreciated that an output pulse is produced on line 264 upon detection of each of the problem detector marks 454 and the timing mark 472 of the test card 450 (FIGURE 5). There is thus produced at the output line 300, which is connected to line 264, both a positive and negative pulse upon the detection of each of the problem detector marks 454 and of the timing mark 472. The negative pulse is employed as an interrogation pulse in a manner to be described.

The line 264 also is connected through a resistor 268 and line 270 to the base of a transistor 274, the base of the latter also being connected through a resistor 272 to ground. The emitter of transistor 274 is connected to ground and the collector through a resistor 278 to a power supply terminal at a negative direct current voltage. The collector terminal of transistor 274 is also connected through a line 276 and a resistor 280 and a line 282 to the base of a transistor 286, the base terminal of which is connected through a resistor 284 to ground. The emitter terminal of transistor 286 is connected to ground and the collector terminal thereof is connected through a resistor 290 to a power supply terminal at a negative direct current voltage. The collector terminal of transistor 286 is also connected through line 288 to the base terminal of transistor 292, the emitter terminal of which is grounded.

The problem detector circuit 22 is disposed adjacent the detectors 10 to sense, in desired time-coordinated relationship, the problem detector marks 454 corresponding to the horizontal rows of answer indication areas *a* through *d* associated therewith. Upon detection of each problem detection mark 454 and the timing mark 472, a negative pulse is produced on line 264 which initiates conduction of transistor 274; conduction of the latter produces a pulse approaching ground potential at the collector terminal thereof which is applied through resistor 280 to the base of transistor 286, terminating its conduction. Termination of conduction of transistor 286 produces a negative pulse at the collector terminal thereof which is applied to the base terminal of transistor 292, causing it to conduct, and thereby to raise the line connected to its collector terminal to ground potential, producing an output pulse at the output of the problem detector circuit 22. In FIGURE 2*a*, the output pulse from the problem detector circuit 22 is applied to the stepping switch 24. The stepping switch 40 comprises a solenoid 293 connected at one terminal to the collector of transistor 292 and at a second terminal to a power supply terminal at a negative direct current voltage. A shunting diode 294 is connected between the terminals of solenoid 293 in a conventional manner. Stepping switch 24 responds to each pulse at the output of problem detector circuit 22 to be cocked and, upon termination of each such pulse, to advance the contact arm 226 to successive ones of the contact terminals 228 and 229. Upon detecting the timing mark 472, the contact arm 226 is advanced to the contact 228 corresponding to the first problem to be corrected which, in the drawings of FIGS. 5 and 6 comprises problem No. 4 and its corresponding transverse line 462. Each successive problem detector mark 454 effects advancing of the contact arm 226 by the stepping switch 24 to the next successive contact 228, and in response to the detection of problem detector mark 454 the contact arm 226 is advanced to the contact 229 to provide a print signal at the stepping switch output shown as line 230 labelled "Print signal" for a purpose to be discussed. Stepping switches operating in this manner are well known in the art, and therefore the stepping switch 24 is shown only in schematic form, the dotted horizontal line paralleling the contacts 228 and 229 representing the mechanical connection from the solenoid 293 to the contact arm 226.

The collector of transistor 274 is also connected to the base of transistor 263, the collector and emitter terminals of which are connected in parallel with the terminals of capacitor 265. Capacitor 265 is connected in series with a variable resistor 267 between a power supply terminal at a negative direct current voltage and a power supply terminal at ground potential to provide a timing circuit in a conventional configuration for an unijunction transistor 271. The emitter of unijunction transistor 271 is connected to the series connection of capacitor 265 and variable resistor 267, a first base terminal thereof is connected through a resistor 269 to ground potential, and a second base terminal thereof is connected through a primary winding 207 of a pulse transformer to the negative power supply terminal. Transistor 263 is normally conducting, shunting the capacitor 265 and maintaining the unijunction transistor 271 nonconductive. Upon detection of a problem detector mark 454, however, the transistor 263 is rendered nonconductive and capacitor 265 begins charging through its series circuit with resistor 267. Upon attaining a predetermined charge across capacitor 265, unijunction transistor 271 is triggered into conduction, producing a current pulse passing through the primary winding 207. The purpose of energizing the primary winding 207 will be explained; however, it should be noted that the energization thereof is effected an adjustable, predetermined time period following detection of one of the problem detector marks 454.

In FIGURE 2b, the logic circuit 14 includes a plurality of transistors 126, 162, 164, and 166 which comprise a plurality of comparison means; the emitter terminal of each transistor 126, 162, 164, and 166 is connected to a power supply terminal at ground potential and the collector terminal of each is connected to a line 128 and through a resistor 136 and line 138 to a power supply terminal at a negative direct current voltage. The output lines 50 of the detectors 26, 28, 30 and 32 of sensing station are connected through resistors to the base terminals of the transistors 126, 162, 164, and 166, respectively. For example, the output line 50 of detector 26 is connected through line 120, resistor 122, and line 124 to the base of transistor 126. In addition, the base terminals of the transistors 126, 162, 164, and 166 are connected to the cathodes of diodes 210, 214, 218, and 222, respectively, and from the anodes thereof to the longitudinal line 238, 240, 242, and 244, respectively. In operation, the presence of an answer indicia at one of the answer indication areas on the test card 450 results in producing a negative signal on one of the output lines 50 of sensing station which is applied to the base of the corresponding one of the transistors 126, 162, 164, and 166 of the logic circuit 14. The negative signal will tend to initiate conduction of the corresponging transistor 126, 162, 164 or 166. However, if the answer indicia is correct, the switchboard 236 (FIGURE 2a) includes a shorting pin connecting the longitudinal line corresponding to the correct answer position through a transverse line and the contact arm 226 to ground, thereby maintaining ground potential at the base of the transistor of the logic circuit 14 receiving the negative signal corresponding to the sensed answer indicia. Thus, where a correct answer has been sensed, all of the comparison transistors 126, 162, 164, and 166 remain non-conductive; the line 128 therefore remains at a high negative potential, determined by that of the negative power supply terminal to which line 128 is connected through resistor 138. The negative potential on line 128 is also produced on line 130, which represents the right answer output logic circuit 14. The negative signal thus produced is a right answer indication. It will be noted that the absence of any answer indication on the test card for a given problem will result in all of the transistors 126, 162, 164, and 166 remaining non-conductive. As a result, the right answer indication also includes a missing answer indication. The circuits for distinguishing between right and missing answer indications will be described below. The right answer signal at output line 130 at all times does represent that no incorrect answer has been sensed on the test card 450 for a given problem.

If the answer is incorrect, the negative signal produced upon sensing the incorrect answer indicia by a detector 26, 28, 30, or 32 of the sensing station is applied to the base of the corresponding one of the transistors 126, 162, 164, or 166 which is not clamped to ground potential through the switchboard 236; as a result, the comparison transistor receiving the negative signal, and which corresponds to the indication area at which the incorrect answer indicia was applied, initiates conduction. Upon conduction of any one of the transistors 126, 162, 164, and 166 the line 128 is raised from its normally negative potential to approximately ground potential, indicating an incorrect answer. The line 128 is connected also to resistor 140 and line 142. For purposes of discussion, the junction of line 128 and resistor 140 may be considered the wrong answer output terminal of logic circuit 14. Since the correct answer output line 130 is connected to line 128, the signals at the right and wrong answer outputs of logic circuit 14 are identical at all times, although they have a different significance as information inputs to associated system components to be described.

The switchboard 236 of the logic circuit 14 therefore operates as an answer indicator to indicate the correct answer to the comparison means of the logic circuit 14.

The comparison means—i.e., transistors 126, 162, 164, and 166—compare the answer information sensed by the detectors 26, 28, 30, and 32 of the sensing station with the correct answer information sensed from the answer indications of the switchboard 236, to determine whether an incorrect answer or a correct or missing answer has been given on the test card.

The AND gate 16 and count right circuit 20 are shown in FIGURE 2b. AND gate 16 comprises three transistors 66, 116, and 117 connected in series between the collector and emitter terminals thereof, and with the collector terminal of transistor 66 connected through a resistor 72 to a power supply terminal at a negative direct current voltage and with the emitter terminal of transistor 117 connected to ground. Each of the transistors 66, 116, and 117 comprises one stage of the AND gate 16; AND gate 16 therefore is a three stage AND gate and requires the simultaneous occurrence of three input signals to the three corresponding stages to be enabled. The input signal to base of transistor 66 is applied thereto from the output line 56 of the OR gate 12 (FIGURE 1) through resistor 62 and line 64. Thus, for each problem in which an answer is provided on the test card, an enabling signal will be applied to the transistor 66. An input signal is applied to the base of transistor 116 from the output line 130 of the logic circuit 14; output line 130 of logic circuit 14 is connected to the internal line 128 thereof. As discussed above, the line 128 remains at a high negative potential in the absence of sensing an incorrect answer; thus, a negative signal is applied to the base of transistor 116 for enabling its conduction at all times except when an incorrect answer is sensed on the test card. An input signal is applied to the base of the transistor 117 through resistor 302 which is connected to the output line 300 from the problem detector circuit 22 (FIGURE 2a), which produces a negative pulse previously defined as the interrogation pulse, upon detection of each of the problem detection marks 454 on the test card 450. Thus, transistor 117 receives the negative interrogation pulse at its base terminal enabling its conduction upon the detection of each problem to be corrected on the test card. When all three stages of AND gate 16 are enabled, a positive going pulse is produced at its output shown as output line 70, which is applied to the count right circuit 20.

The output line 70 of AND gate 16 is connected through a resistor 74 and line 76 to the base terminal of a grounded emitter transistor 78. The collector terminal of transistor 78 is connected through a resistor 84 to a power supply terminal at a negative direct current voltage and through a line 82 a resistor 86 to the base of a grounded emitter transistor 88. The collector and emitter terminals of transistor 88 are connected in series with an actuating coil 92 of a counter 94 to a power supply terminal at a negative direct current voltage. The coil 92 has connected across its opposite terminals a shunting diode 96 in a conventional manner. There is also connected in parallel with the coil 92 an actuating coil 99 of a right visual counter 101, a shunting diode 97 being connected across the terminals of the coil 99 in a conventional manner.

The positive pulse on the output line 70 of AND gate 16, representing the detection of a correct answer, terminates conduction of the normally conducting transistor 78 which, in turn, initiates conduction of transistor 88. Conduction of transistor 88 completes a conducting path to ground from the negative power supply terminal and through each of the actuating coils 92 and 99. Each of the counters 94 and 101 accumulates one count in response thereto. Preferably, right visual counter 101 is reset manually and is permitted to accumulate the total count of correct answers for the test cards of an entire group, such as those representing an entire class of examinees for the purposes of determining a class average, as described above.

The counter 94 is preferably a printing counter and therefore accumulates the number of correct answers for each individual test card, prints the number thus accumulated on the test card, and thereafter is reset automatically prior to the grading of a subsequent test card. For accomplishing the reset function, the counter 231 includes a microswitch 102 which is normally closed in the absence of a test card in the sensing station and, when closed, is operable to close the contacts 100 to clear any previously accumulated count in the counter 94 and to prevent accumulation of any subsequent count. When a test card is received in the sensing station, the switch 102 is opened, thereby opening the switch 100 and enabling the counter 94 to accumulate the correct answer count for a given test card.

The count accumulated by counter 94 is presented on printing type face schematically illustrated by the rectangular element extending to the right of the circular element to which the numeral 94 is applied. Printing solenoid 108, including a conventional shunting diode across its terminals, is connected in series from a power supply terminal at ground potential through the line 110 and through the collector and emitter terminals of a transistor 114 to a power supply terminal at a negative direct current voltage. Transistor 114 is connected at its base terminal through a resistor to the output line 230 of the stepping swith 24 (FIGURE 2a) labelled, "Print Signal From Programming Stepping Switch." With reference to FIGURE 2a, the output line 230 is connected to the contact 229 which is engaged by the contact arm 226 upon completion of commutation of the plurality of contacts 228 of the switchboard 236. When the cntact arm 226 engages contact 229, the output line 230 is thereby connected to ground potential. The signal at ground potential comprises a print sginal which is applied to the base of transistor 114, causing it to conduct and thereby complete a conducting path through the printing solenoid 108 to the negative power supply terminal. The printing solenoid 108 is thereby energized to actuate its core member to force the test card against the type face of the printing counter 94, thereby imprinting on the test card the accumulated number of correct answers indicated on the test card.

As previously discussed the mark-wrong function of the test grading machine of the invention provides for marking the test sheet in the proximity of the answer indication area which represents a correct answer to a given problem, in the event that the problem has been answered incorrectly. Since the illustrative embodiment of the invention, four multiple choice answer indication areas are provided on the test card for each problem, there are provided in the mark-wrong circuit 18 four marking solenoids 178, 180, 182, and 184, as shown in FIGURE 2a. The marking solenoids 178, 180, 182, and 184 have connected across their opposite terminals shunting diodes 179, 181, 183 and 185, respectively, in a conventional manner. A first terminal of each of the solenoids 178, 180, 182, and 184 is connected to a common output line 165. A second terminal of each of the marking solenoids 178, 180, 182, and 184 is connected to the collector terminal of a respectively associated one of the transistors 187, 193, 199, and 205. The emitter terminal of each of the transistors 187, 193, 199, and 205 is connected to a power supply terminal at a negative direct current voltage. The base terminals of the transistors 187, 193, 199, and 205 are connected to the lines 188, 194, 200, and 206, respectively. The lines 188, 194, 200, and 206 are connected to the output, longitudinal lines 238, 240, 242, and 244 of the switchboard 236, respectively.

As discussed previously, in programming the correct answer information into the switchboard 236, a selected one of the longitudinal lines 238, 240, 242, and 244 corresponding to the correct answer position for a given problem is connected to the transverse line (456, 458, 460, and 462) corresponding to that problem. When the contact arm 226 engages the contact 228 corresponding to that transverse line, a signal at ground potential is produced on the associated one of the lines 238, 240, 242, and 244. The correct answer information is thus sensed from the switchboard 236 and indicated to the mark-wrong circuit 18 by the ground potential signal on the particular one of longitudinal lines 238, 240, 242, and 244, and thus on the respectively associated one of the lines 188, 194, 200, and 206 corresponding to that problem's correct answer position.

The ground potential signal on the said one of the lines 188, 194, 200, and 206 establishes a condition for enabling conduction of the respectively associated one of the transistors 187, 193, 199, and 205 of the mark-wrong circuit 18. Although a conducting path to a negative power supply terminal through the enabled one of the transistors 187, 193, 199, and 205, corresponding to the correct answer position as indicated in the switchboard 236, is thus established, energization of the corresponding one of the solenoids 178, 180, 182, and 184 requires completion of a conducting path from the first terminal thereof to a power supply terminal at a more positive, or ground potential.

The common line 165 to which the first terminals of the solenoids 178, 180, 182, and 184 are connected in common, is connected through resistor 163 and line 160 to the collector terminal of a grounded emitter transistor 154. The transistor 154 is rendered non-conductive when a correct answer has been given on the test card, and thus inhibits the operation of the mark-wrong circuit 18 by preventing energization of the marking solenoid corresponding to the correct answer position. Conversely, when transistor 154 is energized in response to the marking of an incorrect answer position on the test card, a conducting path to ground from the common line 165 is completed, through the resistor 163, line 160, and transistor 154, whereby the marking solenoid corresponding to the correct answer position is energized and performs its marking function. The marking of the correct answer position may take any of the various forms and, for this purpose, there is diagrammatically illustrated a unit 275 representing a plurality of marking devices individually and respectively associated with the marking solenoids 178, 180, 182, and 184 and adapted, when the latter are energized, to be individually and selectively actuated to provide a desired marking indication on the test sheet in the proximity of the correct answer indication area.

The control of conduction of transistor 154 to effect the enabling or inhibit functions thereof is effected in response to the comparison function performed by the logic circuit 14. As described previously, when an incorrect answer is sensed, the line 128 in the logic circuit 14 of FIGURE 2b approaches ground potential, producing a positively going pulse on the wrong answer output line of the logic circuit 18.

In FIGURE 2b, the line 128 is connected through a resistor 140 and line 142 to the base of a grounded emitter transistor 144. The collector of transistor 144 is connected through a resistor 148 to a power supply terminal at a negative direct current voltage and through a line 147 and a resistor 149 to the base terminal of a transistor 151. The transistor 151 is connected at its collector terminal through a resistor 153 to a power supply terminal at a negative direct current voltage and at its emitter to the collector terminal of a grounded emitter transistor 145. The base of transistor 145 is connected through a resistor 306 and line 304 to the output line 300 of the problem detector circuit 22. Since the line 128 of logic circuit 18 is normally negative, transistor 144 is normally conducting and thus maintains transistor 284 normally non-conducting.

When the logic circuit 18 determines that a problem has been answered incorrectly, however, a positive going signal is produced on the line 128. The positive signal on line 128 represents a wrong answer output and terminates conduction of transistor 144 and, in turn, enables conduction of transistor 151. As discussed previously, there is produced a negative interrogation pulse on the output line 300 of the problem detector circuit 22 upon the detection of each problem on a test sheet. The simultaneous presence of the interrogation signal on the line 300, and thus on the line 304, and the positive error or wrong signal on the line 128 enables conduction of transistor 145 and thus of the series connected transistors 145 and 151. As a result, a positive going signal is produced at the collector of transistor 151 which is applied through line 152 and resistor 155 to the base of the grounded emitter transistor 162. The collector terminal of transistor 162 is connected through resistor 164 to a power supply terminal at a negative direct current voltage. The collector of transistor 162 is also connected to the output line 146 of AND gate 17.

As shown in FIGURE 2a, the output line 146 of AND gate 17 is connected through resistor 150 to the base of transistor 154. Since transistor 162 is normally conducting, the potential on the output line 146 is normally at approximately ground potential. When a correct answer is sensed, the output line 128 remains at a negative potential and AND gate 17 remains disabled upon the occurrence of the interrogation pulse on line 304. The output line 146 of AND gate 17 therefore remains positive and prevents conduction of transistor 154, thereby inhibiting the marking function of the mark wrong circuit 18. However, upon the occurrence of an incorrect answer, the positive going signal on line 128 and the negative interrogation signal on line 304 enables the AND gate 17, terminating conduction of transistor 162 and producing a negative going signal on the output line 146 of AND gate 17. The negative signal on line 146 causes transistor 154 to conduct, and thus the mark-wrong circuit 18 is operable to perform its marking function.

The mark wrong circuit 18 also includes a wrong visual counter 161 which is diagrammatically illustrated to include an actuating coil 158 connected at one terminal to a power supply terminal at a negative direct current voltage and at the other terminal thereof to the collector terminal of the transistor 154. A shunting diode 159 is connected across the terminals of the coil 158 in a conventional manner. Conduction of transistor 154 operates to energize the actuating coil 158, whereby wrong visual counter 161 accumulates a total count representing the number of incorrect answers of a given test card. The wrong visual counter 161 may accumulate the number of incorrect answers for a single test card, or the total number of incorrect answers for an entire group of test cards, and may mark the number of incorrect answers on each individual test card in a manner described previously with regard to the right answer counter 94.

To assure positive termination of the marking operation of the marking circuit 18, it is desirable that the marking solenoids 178, 180, 182 and 184 be cleared following each marking operation. For this purpose a silicon controlled rectifier (SCR) 209 is provided. Diodes 186, 192, 198 and 204 are connected in series with the solenoids 178, 180, 182 and 184, respectively, at the cathode terminals thereof, and in common at the anode terminals thereof to the cathode terminal of the SCR 209. The anode terminal of the SCR 209 is connected to the common line 165. The SCR 209 therefore is connected in parallel with each of the solenoids 178, 180, 182, and 184 and their respectively associated series connected diodes 186, 192, 198, and 204. A secondary winding 207 of the pulse transformer previously described with relation to the problem detector circuit 22 of FIGURE 2a, is connected at its opposite end terminals between the gate and cathode terminals of the SCR 209. The primary and secondary windings 207 are magnetically coupled, as indicated by the line extending therebetween and identified by the label "Magnetic Coupling."

As described previously, the primary winding 207 is energized a predetermined, controlled interval of time following detection of each problem detection mark on a test card by the problem detector circuit 22. The delay is of a few milliseconds, and assures that the mark-wrong function is completed prior to a clearing of the solenoids 178, 180, 182, and 184. Thus, shortly after the occurrence of mark wrong function, the primary winding 207 is energized. In response thereto, the secondary winding 207 is also energized and triggers the SCR 209 into conduction. The direction of conduction of SCR 209 and each of the diodes 186, 192, 198, and 204 provides a short circuit connection across each of the solenoids 178, 180, 182, and 184, respectively, thereby clearing them. SCR 209 thereupon terminates conduction and the solenoids 178, 180, 182, and 184 are thus again capable of performing their mark wrong function for the next test problem on the test card.

The problem detector signals produced at the output line 300 of the problem detector circuit 22 provide an interrogative function in enabling the AND gates 16 and 17, as will be appreciated from the foregoing description of the operation of the system. It will be appreciated that the interrogate signals thus provided must be in proper time relationship with the presentation of the other input signals to the AND gates 16 and 17. This proper time relationship may readily be achieved by selecting the capacitors 48 of the detectors 26, 28, 30 and 32 and the capacitor 262 in the problem detector circuit 22 to have the appropriate values of capacitance.

It will be apparent that an attempt to fool the test grading machine of the invention by submitting a test sheet having more than one answer indication area marked with an indicia for a given problem, where only a single indication area should be marked as a correct response, or by submitting a test card having no indication areas marked for one or more problems, will be ineffective. As set forth in the previous discussion of the operation, an incorrect answer results in a positive going signal on line 128 of the logic circuit 14 as a result of conduction of one of the transistors 126, 162, 164 and 166. Conversely, the presence of a correct answer is ineffective to cause conduction of the corresponding one of the transistors 126, 162, 164 and 166. As a result, the incorrect answer overrides the effect of a correct answer and causes the mark wrong and count wrong functions to proceed. In addition, a positive going signal is also produced on the correct answer output line 130, since the latter is connected to the line 128 of the logic circuit 14. The positive going signal at the correct answer output line 130 prevents conduction of transistor 116 of AND gate 16. Since AND gate 16 is therefore disabled, the count right functions are prevented from occurring.

If no answers are provided on a test card for a given problem, neither the count right nor the count wrong operations are effected. Since no answer is detected, no output is produced at the output line 56 of OR gate 12 and the AND circuit 16 remains disabled. Conversely, the line 128 of logic circuit 14 remains at a high negative potential, since no incorrect answer has been sensed; as a result, the AND gate 17 remains disabled and the wrong answer accumulation function of wrong visual counter 161 does not occur. Thus, the test grading machine of the invention provides for distinguishing between the presence of an answer, be it correct or incorrect, and the failure to provide any answer at all.

It is also possible to provide for more than one correct answer to a given problem by the simple expedient of placing a connecting pin in the switchboard 236 at each intersection of the longitudinal lines with the transverse line related to the given problem, which intersections represent correct answers to the given problem.

Included with FIGURE 2a is a schematic of a power supply suitable for use with the test grading machine of the invention. A conventional source of alternating current 420 is connected to the primary winding 422 of a transformer. Since the system of the invention employs semiconductor or solid state elements, the necessary biasing potentials and other voltages normally will be of relatively low levels. As a result, the transformer may represent a step-down transformer, whereby a reduced voltage is induced in a secondary winding 424 of the transformer. A conventional full wave bridge rectifier 426 is connected at a first pair of diagonally opposite terminals to the opposite end terminals of the secondary winding 424. A series circuit of an inductor 428 and a capacitor 434 is connected across the other pair of diagonally opposite terminals of the bridge rectifier 426. In addition, resistors 430 and 432 connect the opposite terminals of the capacitor 434 to ground.

As indicated, a positive direct current voltage may be derived from the junction of the capacitor 434, the inductor 428, and the resistor 430; similarly, a negative direct current voltage may be derived from the junction of the capacitor 434 and the resistor 432 and the corresponding terminal of the bridge rectifier 426. It is to be appreciated that the power supply circuit shown is only illustrative of one suitable embodiment of a power supply circuit, and any other suitable power supply may be employed in the alternative.

Figure 3:
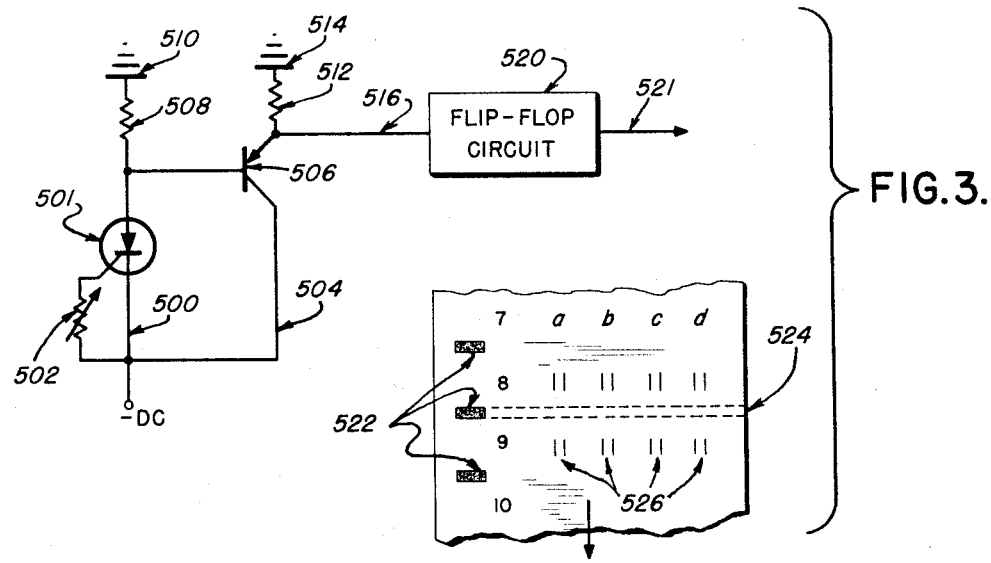
FIGURE 3 shows a schematic of a detection circuit suitable for use in the sensing station of the machine of the invention and an alternative embodiment of a test card suitable for use therewith.

In FIGURE 3 there is shown a schematic of a light sensitive detector circuit which may be employed in the alternative to the detector circuits of the sensing station 26, 28, 30 and 32. The circuit of FIGURE 3 includes a light sensitive device which may comprise a light sensitive SCR 501 of the type described hereinabove. The light sensitive SCR 501 is connected at its anode terminal through a resistor 508 to a power supply terminal 510 at ground potential, and at its collector through a line 500 to power supply terminal at a negative direct current voltage. The gate terminal of the light sensitive SCR 501 is connected through a variable resistor 502 to a negative power supply terminal. A transistor 506 is connected at its base to the anode terminal of the light sensitive SCR 501, at its collector through line 504 to the negative power supply terminal, and its emitter through a resistor 512 to a power supply terminal 514 at ground potential. The emitter terminal of transistor 506 is also connected through line 516 to the input of a flip-flop circuit 520. Since the flip-flop circuit 520 is of conventional design, and its operation is well known in the art, it is shown only in block diagram form.

In operation, the light sensitive SCR 501 responds to light reflected from a test sheet passing through the sensing station and is rendered conductive, as described above. The transistor 506 therefor is also normally conducting and flip-flop circuit 520 remains in a first state. When an indicia is sensed, conduction of light sensitive SCR 501 terminates, producing a positive pulse at its anode terminal which terminates conduction of transistor 506. Transistor 506 remains nonconductive for the duration of the sensing of the indicia by the light sensitive SCR 501, and produces a corresponding positive going pulse at its emitter terminal. The positive going pulse sets the flip-flop circuit 520, whereby the latter produces an output pulse at its output 521 indicating the detection of an indicia.

It is well known in the art that a conventional operation of a flip-flop circuit is to switch from a first to a second conductor state to produce first and second output signals. In the context of the system of the invention, it will be appreciated that the first output signal produced by that flip-flop circuit 520 when in a first, normal state, will represent that no indicia has been sensed by the associated light sensitive SCR 501. Conversely, the second output signal, produced upon switching of the flip-flop circuit 520 to a second state, will represent that an indicia has been sensed by the associated light sensitive SCR 501. The flip-flop circuit 520 may remain in the second state for a desired period, thereby to produce an output, representing a sensed indicia, which is maintained for a desired duration. The flip-flop circuit 520, however, obviously must be reset to its first state prior to sensing of a subsequent problem on a test sheet so that an output pulse produced thereby and representing sensed indicia is time coordinated with but the single problem to which the indicia relates. The detection circuit of FIGURE 3 is employable for sensing a test card 524 of the type also shown in FIGURE 3. It will be apparent from the configuration of the test card 524 the preferred manner of resetting the flip-flop circuit 520, as discussed below. The test card 524 includes a plurality of vertical columns of answer indication areas shown by pairs of short, closely spaced parallel lines 526 aligned in columns identified by the letters a, b, c and d. The pairs of vertical lines 526 are also aligned horizontally with numerals indicating the problem number, and shown as problem numbers 7 through 10. The test card 524 also includes a plurality of problem detection marks 522 aligned in a vertical column and spaced intermediate the numerals and identifying the problems and their associated parallel lines 526 defining generally the answer indication areas for each problem.

The detection circuit of FIGURE 3 operates as follows in scanning the test card 524. An indicia applied to the test card 524 and occurring horizontally between the parallel lines 526 of a given indication area, and vertically between the adjacent edges of a pair of the problem detection marks 522 spaced above and below the problem number, will be sensed and will be detected and effective as an answer indicia to the problem. For example, an indicia representing an answer to problem 8 in column a will be sensed, so long as the indicia is located at least in part within the boundaries defined by the parallel lines 526 of column a and the upper horizontal dotted line aligned with the upper edge of the problem detection mark 522 below problem 8 and a corresponding horizontal dotted line (not shown) aligned with the lower edge of mark 522 above problem 8.

The successful sensing of indicia located within the boundaries of a given indication area as described above results from the characteristics of the detection circuit of FIGURE 5. As long as the answer indicia to a given problem is located within the boundaries indicated above, the light sensitive SCR 501 will detect the indicia and thereby will effect switching of the flip-flop circuit 520 to its second state. Flip-flop circuit 520 will remain in the second state thereafter until receiving a reset pulse. The appropriate reset pulse must correspond closely in time to the trailing boundary of the indication areas for each problem as the test card 524 passes through the sensing station, such that the flip-flop circuit 520 is returned to its first state prior to the passage of the leading boundary of the answer indication areas of a subsequent problem into the detection area. It is apparent that the interrogation pulse from the problem detector circuit 22 is suitable for use as the reset pulse, since an interrogation pulse is generated in response to detection of each problem detection mark 522.

Since, as previously discussed, the interrogate pulse must occur during the occurrence of the answer detection signal, the flip-flop circuit 520 must remain in the second conducting state to which it is set upon detection of an answer indicia, until detection of the next occurring problem detection mark 522, at which time it is reset to its first state. The flip-flop circuit 520 resets very rapidly, and thus is prepared for the sensing and detecting operations for the next subsequent problem.

In addition to providing greater flexibility in responding to answer indicia and thus not requiring the indicia to be applied to the answer indication areas with any great degree of accuracy, the detection circuit of FIGURE 3 also assures that the output pulses at its output 521 are well defined and of an accurately controlled duration. Since the interrogation signals effect the termination of the signals corresponding to sensing of an answer indicia, the necessary time coordination of the sensing and interrogation signals is inherently achieved.

Figure 4:
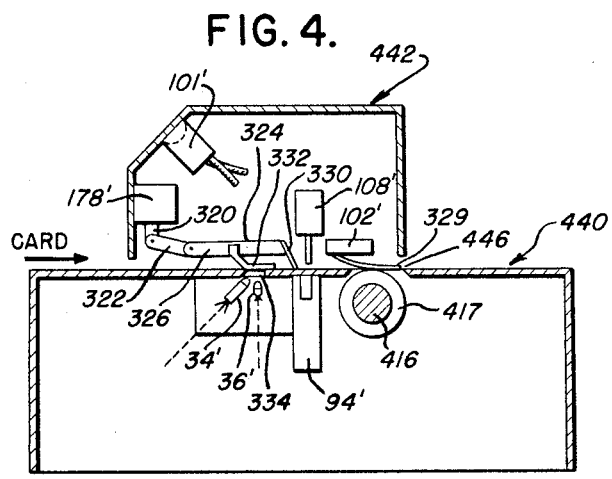
FIGURE 4 is a side elevational view of a test grading machine built in accordance with the preferred embodiment of the invention.

In FIGURE 4 there is shown, in vertical section, a schematic representation of a test grading machine constructed in accordance with the system of the invention. The view of FIGURE 4 is provided merely for suggesting an appropriate physical arrangement and relative location of the components of the test grading machine and does not show the electrical circuits of the system components which have been described in detail above. The physical components which are identical to the system components of the foregoing figures are shown by identical, but primed numerals.

The structure of FIGURE 4 includes a lower housing 440 on which is supported an upper housing 442. An entrance slot, as indicated by the arrow and the label, "card," adjacent thereto, and an exit slot 446 are provided in horizontal alignment between the upper housing 442 and the lower housing 440 through which a test card is passed. A motor 417 is supported on the lower housing 440 and drives a transport mechanism for moving the test cards automatically from the entrance slot and through the grading machine to the exit slot 446.

The sensing station is diagrammatically represented by a light source 34′ and a light sensitive detection device 36′. As described above, a plurality of detection devices are incorporated in the sensing station, corresponding to the columns of answer indication areas on the test card to provide individual detection of answer indicia in the columns of answer indication areas. The other detectors are not shown, however, since the detectors are disposed in side-by-side relationship, transverse to the direction of card motion, and thus are concealed behind the detector 361. The logic and other circuits are not shown but may be suitably disposed in either the upper housing 442 or the lower housing 440.

The mark wrong circuit is represented by a single marking solenoid 178′ mounted on the front vertical wall of the upper housing 442. The solenoid 178′ includes a plunger 320 pivotally connected to pivot arms 322 and 324 supported on pivot mount 326. A marking device 330 is carried by the pivot arm 324. Upon energization of solenoid 178′ in response to sensing of an incorrect answer, the solenoid 178′ is energized to actuate the plunger 320 and move the marking device 330 into engagement with the test card. Since, in the configuration of the machine of FIG. 4, the indicia detection is accomplished by reflected light, it is apparent that the test cards are passed through the machine with the side of the test card bearing the answer indicia disposed toward the illumination source 34′ and the detector 36′. The correct answer marking has been stated to be in the proximity of the correct answer indication area, and thus the marking device 330 is assumed to be capable of performing this function with regard to its corresponding column of answer indication areas. Additional marking devices are included in the housing 442 disposed in side-by-side relationship with the solenoid 178′ and its associated apparatus, and thus are not indicated in FIG. 4. FIGURE 4 is hereby illustrative of one possible packaging arrangement of the test grading machine of the invention, and other arrangements may be employed in the alternative.

The count right and printing counter 94′ is mounted on the housing 442 and suspended from the upper horizontal wall thereof. The printing solenoid 108′ and its movable arm are disposed above the printing counter 94′ and are operable to force the test card against the type presented by the printing counter 94′ to print the grade on the test card. The microswitch 102′ includes a spring feeler 329 which responds to the passing of the test card through the machine to operate the microswitch 102′ to clear and reset the printing counter 94′, as described previously.

The microswitch 102′ may also act to reset the stepping switch 24 upon completion of correcting and grading each test card. Display devices may be mounted on the diagonal wall of the upper housing 442, as represented by the right visual counter 101′, for providing a visual display of accumulated counts.

From the foregoing description of the test grading machine of the invention, it will be appreciated that the machine is of relatively simple construction and requires a minimum of components, whereby it is compact in size and low in cost. The machine is very simple to operate and thus does not require trained personnel. Further, the machine automatically and quickly grades test cards, and provides marking in the proximity of the correct answer indication area for which an incorrect answer has been provided. Further, the test grading machine provides for accumulating as separate counts the total number of correct responses and the total number of incorrect responses for each test and, if desired, the corresponding totals for all tests of a group of tests. The counts thus accumulated permit calculating the number of problems for which no answer has been marked on the test card and thus readily permits weighted grading of the incorrect answers, as compared to omitted answers. The marking of the correct answer position when an incorrect answer has been provided is very desirable in that the examinee is then immediately informed of the correct answer to each problem which he has answered in error.

Numerous modifications and adaptations of the test grading of the invention will be readily apparent to those skilled in the art and thus it is intended by the appended claims to cover all such modifications and adaptations which fall within the true spirit and scope of the invention.

The specification, claims and drawings of my parent application Serial No. 368,612, filed May 19, 1964, and entitled, "Test Grading Machine," are hereby incorporated into the present application by reference.

What is claimed is:

1. An apparatus for grading answers to problems of the multiple choice type, wherein the answer to each problem is indicated on a test sheet having answer indication areas for each problem, the number of indication areas for each problem corresponding to the number of answer choices for the problem, said apparatus comprising in commbination:

storage means for storing the correct answers to the problems, means for comparing each answer indicated on a test sheet with the corresponding correct answer in said storage means, and means responsive to said comparing means for marking the test sheet in the proximity of the indication area corresponding to the correct answer for each problem only when said comparing means determines that an incorrect answer to the problem is indicated on the test sheet.

2. An apparatus for grading answers to problems of the multiple choice type, wherein the answer to each problem is indicated on a test sheet having answer indication areas for each problem, the number of indication areas for each problem corresponding to the number of answer choices for the problem, said apparatus comprising in combination:

storage means for storing the correct answers to the problems, means for comparing each answer indicated on a test sheet with the corresponding correct answer in said storage means, means responsive to said storage means for marking the test sheet in the proximity of the indication area corresponding to the correct answer for each problem, and means responsive to said comparing means for inhibiting said marking means when a correct answer to the problem appears on the test sheet.

3. An apparatus for grading answers to problems of a multiple choice type, wherein the answer to each problem is represented on a test sheet having a plurality of answer indication areas corresponding to the answer choices for the problem by an indicia applied to a selected answer indication area, said apparatus comprising in combination:

programming means for indicating the correct answers to the problems, means for sensing the answers on the test sheet, means for comparing the indicated correct answers and the sensed answers, means responding to said programming means for marking the test sheet in the proximity of the indication area corresponding to the correct answer for each problem, and means responsive to said comparing means for inhibiting said marking means when a correct answer to the problem appears on the test sheet.

4. The combination as recited in claim 3 wherein:

said sensing means includes means for detecting each problem on said test sheet in succession, said programming means includes means for storing the correct anwers to the problems and means for scanning said storage means, and said scanning means is operative in response to said detection means to indicate the correct answer information in said storage means to said comparing means in time coordination with the response of said comparing means to the sensing of the answer for each successive problem on the test sheet.

5. The combination as recited in claim 3 wherein:

said comparing means produces for each problem a first output if no incorrect answer is sensed and a second output if an incorrect answer is sensed, said sensing means provides a sensed answer output in response to the sensing of an answer for each problem on the test sheet, and there is further provided:

a first counting means responsive to the mutual occurrence of a first output from said comparing means and a sensed answer output from said sensing means for each problem to accumulate a count representing the total number of correct answers on the test sheet.

6. The combination of claim 5 wherein there is further provided:

a second counting means for responding to the occurrence of a second output from said comparing means for accumulating a count representing the total number of incorrect answers on the test sheet.

7. The combination as recited in claim 5 wherein:

said first counting means includes printing means for printing the total number of correct responses automatically on the test sheet.

8. The combination as recited in claim 5 wherein there is further provided:

a detection means for detecting each problem on the test sheet and producing an interrogation signal in response thereto, said first counting means responding to said interrogation signal from said detecting means during the mutual occurrence of said first output from said comparing means and said sensed answer output from said sensing means, for accumulating said count.

9. An apparatus for grading and marking test sheets having indicia applied thereto representing answers to a plurality of problems of a multiple choice type, wherein there are provided on the test sheet a plurality of answer indication areas corresponding to the number of answer choices for each problem and wherein answer indication areas corresponding to related answer choices for the plurality of problems are aligned in columns, said apparatus comprising in combination:

a programming station including storage means for storing the correct answer information to each problem, having a plurality of positions thereon corresponding to the number of answer choices for each problem of the plurality of problems and said positions being arranged in groups corresponding to the related answer choices for the plurality of problems and each of said positions being adapted for selectively indicating a correct answer to each problem, a sensing station including a plurality of answer detection means corresponding to the plurality of columns of answer indication areas, said plurality of answer detection means being operable to detect the presence of answer indicia at the corresponding plurality of answer indication areas associated with each problem, logic means including a plurality of comparison means, each of said comparison means responding to a respectively associated one of said detection means and selectively to each position of a respectively associated group of positions in said storage means to determine whether in answer indicia detected by the respectively associated detection means in the corresponding answer indication area for a given problem corresponds to the answer information stored at the related position of the storage means corresponding to that answer indication area, marking means including a plurality of individually energizable marking devices corresponding to respectively associated ones of the plurality of columns of answer indication areas on the test sheet, and said marking devices responding selectively to each position of a respectively associated group of positions of said storage means for marking the test sheet in the proximity of the answer indication area representing the correct answer to each problem on the test sheet, and means responsive to said logic means to inhibit the operation of said marking means for a given problem on the test sheet when the logic means determines that a correct answer indicia has been applied to the test sheet for that given problem.

10. The combination of claim 9 wherein there is further provided:

problem detection means for detecting each problem on the test sheet and producing a stepping signal in response thereto, and scanning means for scanning said storage means and operable in response to said stepping signals for selectively indicating to said logic means the correct answer information for each of the plurality of problems in succession and in time coordination to the response of said logic means to the sensed answer indicia for the corresponding problems.

11. The combination recited in claim 9 wherein there is further provided:

clearing means, delay means, said delay means being operable in response to each stepping signal produced by said problem detection means for producing a delayed clearing signal, and said clearing means responding to each clearing signal for clearing said marking devices subsequently to each marking operation thereof.

12. The combination of claim 9 wherein each of said answer detection means comprises a light-sensitive device for responding to an answer indicia.

13. The combination as recited in claim 9 wherein each of said answer detection means comprises:

a light-sensitive device switchable between conducting and non-conducting states in response to the detection of an answer indicia, an invertor for responding to the change in conduction of said light-sensitive device, and a bistable circuit responding to the output of said invertor and normally maintaining a first conducting state, said bistable circuit being switchable to a second conducting state in response to the detection of an answer indicia for a given problem on the test sheet and being switchable to return to the first conducting state upon detection of a subsequent problem on the test sheet.

14. In a machine for grading and marking students' test cards according to their comparison with indicia appearing on a similar answer indicator and relating to multiple choice responses to a series of questions,
- the test card and answer indicator having correspondingly arranged columns of multiple choice positions,
- the multiple choice positions of the answer indicator having indicia applied in accordance with the correct responses to said questions, and the positions of the test cards having indicia variously applied so as to be indicative of correct and incorrect answers to said questions,
- means establishing a first sensing station for the test cards,
- means establishing a second sensing station for the answer indicator,
- means for impelling the test cards successively through the first sensing station in endwise fashion,
- means for repeatedly scanning the answer indicator at the second sensing station in timed relation to the movement of the test cards through the first sensing station,
- means at said first and second sensing stations for comparatively sensing the indicia on the test cards and answer indicator, respectively,
- a series of energizable marking devices at said first sensing station and operable when energized to mark respectively the multiple choice position on successive test cards passing through said first station in accordance with the sensed indicia on the answer indicator,
- means normally responsive to the sensing of an indicia on the answer indicator for energizing a corresponding marking device, and
- means responsive to the simultaneous sensing of corresponding indicia on a test card and the answer indicator for disabling the energizing means for the corresponding marking device.

15. In a machine for grading and marking students' test cards according to their comparison with indicia appearing on a similar answer indicator and relating to multiple choice responses to a series of questions,
- the test card and answer indicator having correspondingly arranged columns of multiple choice positions,
- the multiple choice positions of the answer indicator having indicia applied in accordance with correct responses to said questions, and the positions of the test cards having indicia variously applied so as to be indicative of correct and incorrect answers to said questions,
- means establishing a first sensing station for the test cards,
- means establishing a second sensing station for the answer indicator,
- means for impelling the test cards successively through the first sensing station in endwise fashion,
- means at said first and second sensing stations for comparatively sensing the indicia on the test cards and answer indicator, respectively,
- means for repeatedly effecting relative movement between said indicator and said sensing means at said second sensing station in timed relation to the movement of the test cards through the first sensing station,
- a series of energizable marking devices at said first sensing station and operable when energized to mark respectively the multiple choice positions on successive test cards passing through said first station in accordance with the sensed indicia on the answer indicator,
- means normally responsive to the sensing of an indicia on the answer indicator for energizing a corresponding marking device, and
- means responsive to the simultaneous sensing of corresponding indicia on a test card and the answer indicator for disabling the energizing means for the corresponding marking device.

16. In a machine for grading and marking students' test cards according to their comparison with indicia appearing on a similar answer indicator and relating to multiple choice responses to a series of questions,
- the test card and answer indicator having correspondingly arranged columns of multiple choice positions,
- the multiple choice positions of the answer indicator having indicia applied in accordance with correct responses to said questions, and the positions of the test cards having indicia variously applied so as to be indicative of correct and incorrect answers to said questions,
- means establishing a first sensing station for the test cards,
- means establishing a second sensing station for the answer indicator,
- means for impelling the test cards successively through the first sensing station in endwise fashion,
- means at said first and second sensing stations for comparatively sensing the indicia on the test cards and answer indicator, respectively,
- a series of energizable marking devices at said first sensing station and operable when energized to mark respectively the multiple choice positions on successive test cards passing through said first station in accordance with the sensed indicia on the answer indicator,
- means normally responsive to the sensing of an indicia on the answer indicator for energizing a corresponding marking device, and
- means responsive to the simultaneous sensing of corresponding indicia on a test card and the answer indicator for disabling the energizing means for the corresponding marking device.

References Cited by the Examiner

UNITED STATES PATENTS

| | | | |
|---|---|---|---|
| 3,176,414 | 4/1965 | Leathers | 35—48 |
| 3,176,415 | 4/1965 | Leathers | 35—48 |
| 3,212,203 | 10/1965 | Atkinson | 35—48 |
| 3,216,132 | 11/1965 | Flaherty et al. | 35—48 |

EUGENE R. CAPOZIO, *Primary Examiner.*

R. E. KLEIN, *Assistant Examiner.*